United States Patent [19]

Freek et al.

[11] Patent Number: 5,996,837
[45] Date of Patent: Dec. 7, 1999

[54] METHOD AND APPARATUS FOR FORMING DRINK-THRU CUP LIDS

[75] Inventors: Michael Alan Freek; Scott Goodyear; Jack Patel, all of Toronto, Canada

[73] Assignee: Fort James Corporation, Deerfield, Ill.

[21] Appl. No.: 08/903,177

[22] Filed: Jul. 30, 1997

Related U.S. Application Data

[62] Division of application No. 08/700,103, Aug. 20, 1996, Pat. No. 5,798,079.

[51] Int. Cl.⁶ .................................................... A47G 19/22
[52] U.S. Cl. ............................................ 220/713; 220/380
[58] Field of Search .................................. 220/711, 713, 220/716, 717, 718, 380; 215/387

[56] References Cited

U.S. PATENT DOCUMENTS

| | | | |
|---|---|---|---|
| 2,534,614 | 12/1950 | Michael | 220/713 X |
| 3,901,640 | 8/1975 | Tigner et al. | |
| 3,928,523 | 12/1975 | Ward et al. | |
| 3,954,374 | 5/1976 | Wommelsdorf et al. | |
| 4,025,275 | 5/1977 | Gournelle | |
| 4,059,380 | 11/1977 | Judzis et al. | |
| 4,112,042 | 9/1978 | Brocklehurst | |
| 4,350,260 | 9/1982 | Prueher | 220/254 |
| 4,441,624 | 4/1984 | Sokolowski | 220/254 |
| 4,443,401 | 4/1984 | Turner | |
| 4,480,979 | 11/1984 | Keith et al. | |
| 4,589,569 | 5/1986 | Clements | 220/380 |
| 4,795,052 | 1/1989 | Hayes et al. | 220/369 X |
| 4,941,814 | 7/1990 | Araki et al. | |
| 5,183,172 | 2/1993 | Boller | 220/270 |
| 5,188,787 | 2/1993 | King et al. | |
| 5,253,781 | 10/1993 | Van Melle et al. | 220/713 |
| 5,398,843 | 3/1995 | Warden et al. | 220/711 |
| 5,624,053 | 4/1997 | Freek et al. | 220/713 |

*Primary Examiner*—Stephen K. Cronin
*Attorney, Agent, or Firm*—Sixbey, Friedman, Leedom & Ferguson, PC; Charles M. Leedom, Jr.; Donald R. Studebaker

[57] ABSTRACT

An apparatus and method for forming a lid having an annular mounting portion, an annular trough region positioned radially inward of the annular mounting portion, an annular side wall extending upwardly from an inner periphery of the annular trough region to an annular ridge adjacent said annular side wall, and a crown region is set forth. The apparatus includes a forming die having an upper surface of a configuration conforming to the configuration of the lid, a forming ring for aiding in the forming of the lid, a positioning device for positioning the thermoformable sheet material adjacent the upper surface of the forming die between the forming die and the forming ring and a drive mechanism for lowering the forming ring into contact with the sheet material. The method includes contacting that portion of the sheet material which forms a lowermost region of the lid with the forming ring so as to carry the material down into the lowermost region of the forming die.

5 Claims, 5 Drawing Sheets

METHOD AND APPARATUS FOR FORMING DRINK-THRU CUP LIDS

This is a Divisional application of Ser. No. 08/700,103, filed Aug. 20, 1996, now U.S. Pat. No. 5,798,079.

TECHNICAL FIELD OF THE INVENTION

The present invention relates generally to a method and apparatus for forming lids for beverage containers and more specifically to a method and apparatus for forming lids having a raised dome configuration.

BACKGROUND OF THE INVENTION

It is well-known to provide covers for drinking containers to prevent the spillage of the contents of the container. Many prior art covers incorporate an opening in the top of the cover in order to allow drinking of the contents either in the normal drinking fashion or by the insertion of a straw. Some covers utilize a releasable drinking flap in order to prevent the sloshing of the contents out of the containers. Other covers have an opening which is sealed by a depressible tab such that when the tab is depressed, the opening is unsealed for either drinking the contents of the container or for the pouring of the contents from the container.

As discussed hereinabove, lids have been proposed having preformed openings therein which permit the contents of the container to be drank through the opening or the contents to be poured from the container without removing the lid. However, in many proposed designs, the opening is positioned in a manner such that when the container is full, the contents may be readily spilled therefrom if the container is jarred even the slightest. In an effort to overcome the spillage problems consumption of the contents of the container by the consumer is difficult due to the positioning of the opening. In an effort to overcome the aforementioned shortcomings, the lid design set forth in U.S. Pat. No. 4,441,624 issued to Sokolowski discloses a drinking cover for a beverage container including a circular wall and annular side wall which is sealingly received on a respective container. In this instance, the top wall is tapered downwardly from front to back and includes an opening therein which is covered by a sealing flap which is positioned on the inside of the top wall of the cover. When pressure from the user's mouth is placed about the opening in the top wall, the sealing flap is displaced from the opening permitting the contents of the container to be poured therefrom. However, manufacturer of such a lid requiring a two-piece construction is both complicated and expensive and results in a lid design which is cumbersome and difficult to use by the consumer.

A similar lid design disclosed in U.S. Pat. No. 4,589,569 issued to Clements includes a lid construction having an annular mounting portion for engaging the lip of a respective cup as well as an annular side wall similar to that discussed hereinabove. Additionally, a recess for receiving the lip of the consumer is provided in a top surface of the lid to allow the consumer to grip the portion of the lid adjacent the drink-thru opening formed in the top wall. Such lids are generally manufactured using a thermoforming process wherein a softened plastic blank is vacuum formed to a die thereby conforming the blank to the shape of the die. This process may be similar to that set forth in U.S. Pat. No. 3,928,523 issued to Ward et al.

Therein, a method for molding a thermoformable plastic sheet is set forth wherein the thermoformable plastic sheet is formed over a male die which includes a plurality of passages which permits air trapped between the sheet and die to escape and/or which may be connected to a vacuum source for reducing the pressure within the passages. With the lid configurations discussed hereinabove, such a process is sufficient in forming these lids. Particularly, with the lid of Clements, because there is no plug fit and thus no substantial trough between the raised dome side wall and the annular sealing ridge, the problems presently experienced do not occur. Specifically, when forming lids of the type disclosed in U.S. application Ser. No. 467,718 filed Jun. 6, 1995, the contents of which are hereby incorporated herein by reference, having a domed top surface and plug fit, the material in the plug fit area is thinned to the point where the lid would collapse when the load necessary to secure the lid to the cup was applied to the domed lid. Accordingly, the process and apparatus set forth in detail hereinbelow becomes particularly useful when forming lids of this type.

Clearly, there is a need for a method and apparatus for forming a disposable drink-thru lid having a domed surface and which can be applied to a cup in a plug fit manner without the lid collapsing under the load applied thereto.

SUMMARY OF THE INVENTION

A primary object of the present invention is to provide a method and apparatus for forming a disposable drink-thru lid which overcomes the aforementioned shortcomings associated with prior art processes.

A further object of the present invention is to provide a disposable drink-thru lid which when applied to a container does not collapse under the pressure applied thereto.

Yet another object of the present invention is to provide a method and apparatus for forming a disposable drink-thru lid including a significant annular trough for forming a plug fit with the container in which the lid is placed.

A still further object of the present invention is to provide a method and apparatus for forming a disposable drink-thru lid wherein the top wall of the lid is formed having a raised central portion and an annular mounting portion which forms a plug fit with the cup on which the lid is placed.

These as well as additional advantages of the present invention are achieved by carrying out a method of forming a lid having an annular mounting portion, an annular trough region positioned radially inward of the annular mounting portion, an annular side wall extending upwardly from an inner periphery of the annular trough region to an annular ridge adjacent said annular side wall, and a crown region. The method includes the steps of providing a forming die having an upper surface of a configuration conforming to the configuration of the lid, providing a forming ring for aiding in the forming of the lid, positioning a thermoformable sheet material adjacent the upper surface of the forming die between the forming die and the forming ring, lowering the forming ring into contact with the sheet material and conforming the sheet material to the configuration of the forming die. When lowering the forming ring, the forming ring contacts that portion of the sheet material which forms a lowermost region of the lid and carries the material down into the lowermost region.

Similarly, an apparatus for forming the lid is also set forth for achieving the above noted advantages and includes a forming die having an upper surface of a configuration conforming to the configuration of the lid, a forming ring for aiding in the forming of the lid, a positioning device for positioning the thermoformable sheet material adjacent the upper surface of the forming die between the forming die and the forming ring and a drive mechanism for lowering the forming ring into contact with the sheet material such that the forming ring contacts that portion of the sheet material which forms a lowermost region of the lid and carries the material down into the lowermost region.

These, as well as additional objects of the present invention will become apparent from the following detailed description when read in light of the several figures.

DETAILED DESCRIPTION OF THE PREFERRED EMBODIMENT

Figure 2:
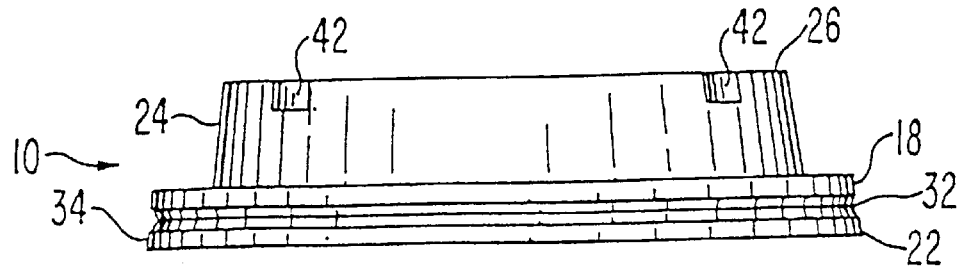
FIG. 2 is an elevational view of the lid of FIG. 1.
Figure 7:
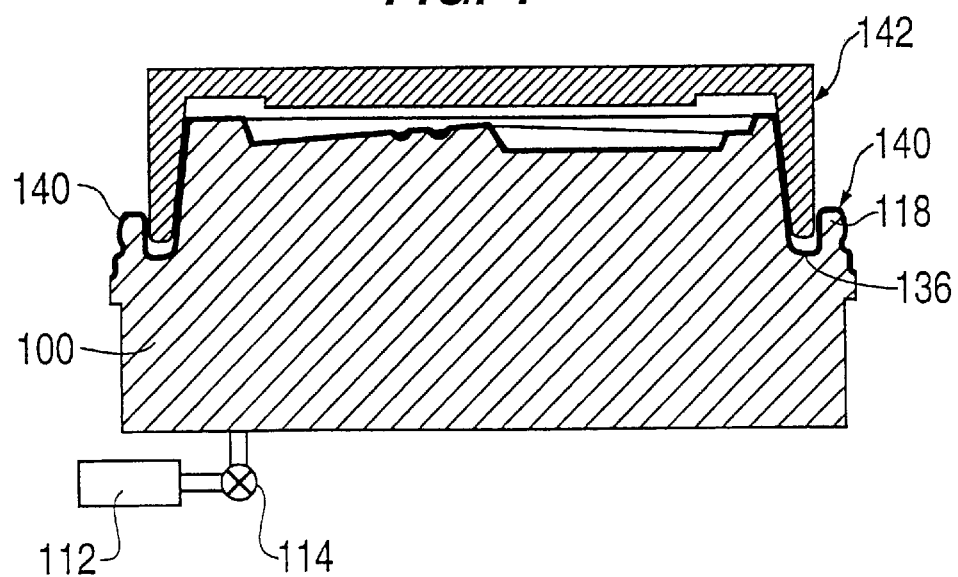
FIG. 7 is a cross-sectional view of the plug assist ring in combination with the male die of FIG. 6 in accordance with the present invention.
Figure 8:
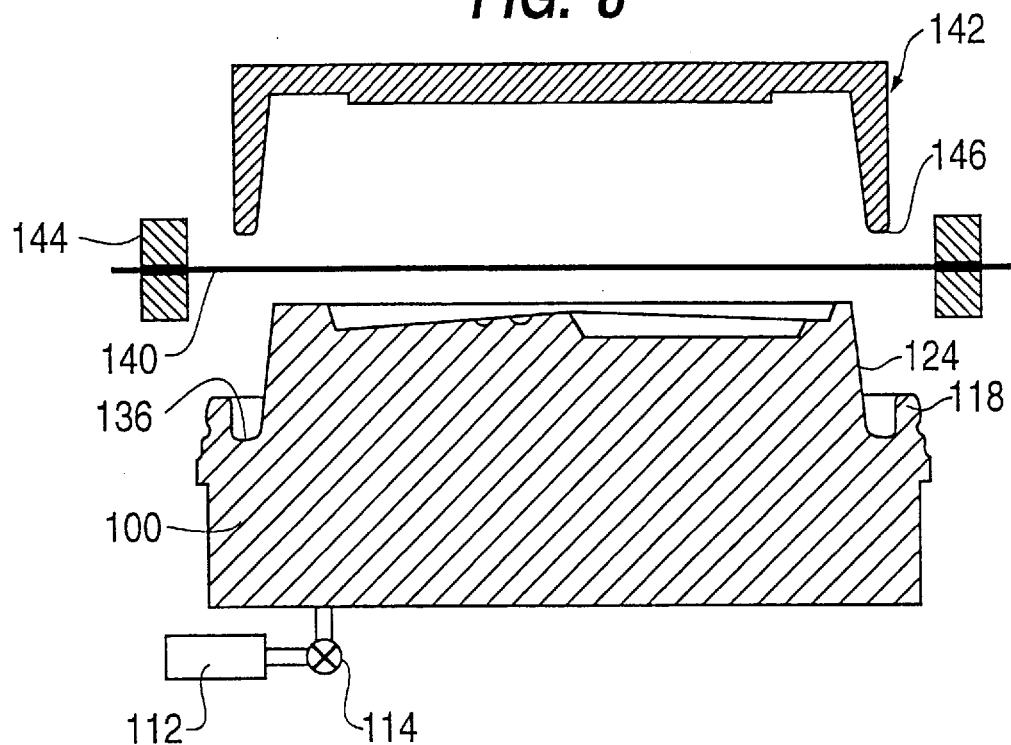
FIG. 8 is a cross-sectional view of the plug assist ring of the present invention in its uppermost position with respect to the male die.
Figure 9:
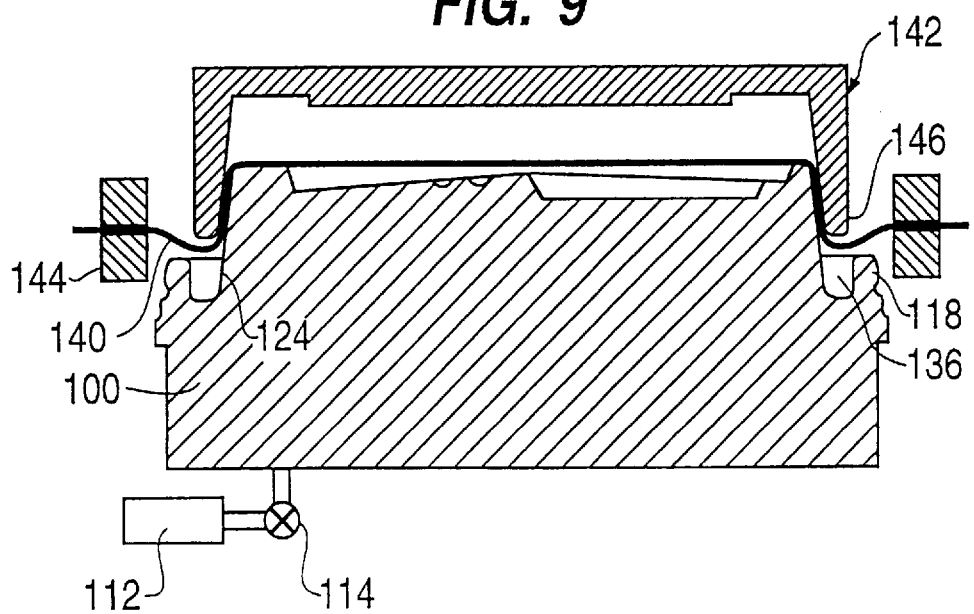
FIG. 9 is a cross-sectional view of the plug assist ring of the present invention in a descending position.

The present invention is substantially embodied in a plug assist ring 100 illustrated in detail in FIGS. 7–9. In order to fully understand the importance of the plug assist ring 100, and the method of manufacturing cup lids embodying the present invention, reference will initially be made to a cup lid which particularly benefits from such method and plug assist ring 100. Such a lid configuration is generally embodied in a lid 10 for a drinking cup 12. For convenience of description, terms such as "upward", "downward", "horizontal", etc., as used herein, refers to the lid and manufacture of such lid in the orientation as illustrated in FIG. 2, however, during use, the lid 10 normally assumes various different orientations.

Figure 5:
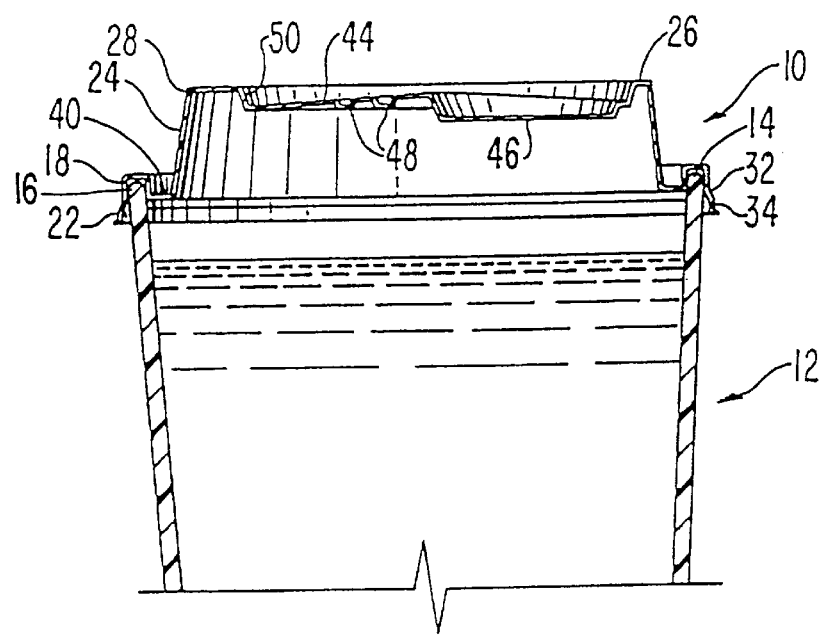
FIG. 5 is a cross-sectional view of the lid in FIG. 1 positioned on a cup.

The lid 10 may be used with cups of various types, and is particularly suitable for use with disposable cups of the type commonly used as carry-out containers for beverages such as coffee and the like. Such cups are commonly made of Styrofoam, plastic or paper. As illustrated in FIG. 5, the illustrated cup 12 has a generally circular upper lip or rim 14 with a bead 16 formed on it for receiving and securing the lid thereon.

The lid 10 provides a cover for the cup 12 which inhibits spillage and reduces heat transfer between the beverage and the surrounding atmosphere. The lid 10 is secured in place on the cup 12 by an annular mounting portion 18 which engages the rim or lip 14 of the cup. A preformed opening 20 is provided in the lid 10 to enable drinking from the cup 12 without removal of the lid 10. While the preformed opening 20 is illustrated as being merely an opening in the lid, the opening 20 may include a cover or plug which may be readily removed by the consumer prior to consumption of the contents of the cup.

The drinking opening 20 is positioned so that one may drink from the opening 20 without contacting the bottom edge 22 of the lid 20 with his lower lip, which may be uncomfortable. Accordingly, the lid 10 includes an annular side wall 24 extending upwardly from the mounting portion 18 to an annular ridge 26 extending around the top of the lid 10 and having a generally circular periphery 28 adjoining the side wall 24, with the drinking opening 20 being formed in the annular ridge 26.

Referring now to FIGS. 1, 2, 4, and 5, the mounting portion 18 includes a resilient annular gripping portion 32 configured to grip the bead 16 on the lip 14 of the cup 12 and seal there-against as is the case with numerous disposable lids. To facilitate mounting of the lid 10 on the cup 12 and movement of the gripping portion 32 into gripping engagement with the bead 16, the mounting portion 18 further includes an outwardly flared skirt 34 depending from the gripping portion 32. As the lid 10 is pushed downwardly onto the lip 14 of the cup 12, the skirt 34 aids in centering the lid and in deflecting the gripping portion 32 to an open position to enable it to fit over the bead 16. An annular channel 36, the significance of which will be explained in greater detail hereinbelow is defined at the junction of the gripping portion 32 and the bottom of the side wall 24 which enables liquid to be retained should such liquid drip down the side wall 24.

To enable the drinking opening 20 to be spaced from the lower edge 22 of the lid 10 by a distance sufficient to enable one to drink through the opening 20 without contacting the lower edge 22 of the lid 10 with his lower lip 23, the side wall 24 extends upwardly from the mounting portion 18 a distance of about 0.5 inches or more. The spacing of the opening 20 from the mounting portion 22 also serves to inhibit accidental splashing of liquid upward through the opening 20, and enables portions of the lid 10 contacted by the user's mouth to remain relatively cool when a hot beverage is contained in the cup. In the illustrated embodiment, the height of the side wall is slightly over 0.5 inches. Further, when this lid is manufactured in accordance with the method and apparatus set forth in detail hereinbelow, this height provides the advantages described above without requiring the material costs associated with production of the lid to be unacceptably high, and without making the lid so bulky as to be unattractive or inconvenient to handle and store. Thus, the lid can be manufactured without using a thicker lid material and which will not collapse when applied to a cup. The side wall 24 is preferably frusto-conical in shape, sloping upwardly and radially inward from the mounting portion to the annular ridge 26. However, the annular side wall 24 may extend substantially vertically upward from the mounting portion 18. A vent hole 38 is also formed in the annular ridge 26 to enable air flow into the cup 12 as the user drinks from the cup 12 to facilitate the flow of liquid out of the cup 12 through the drinking opening.

As discussed hereinabove, bridging the space between the mounting portion 18 and the upstanding annular wall 24 is the annular channel 36 which readily receives any fluid which may flow out of the opening 20 when the container is jarred or which may be split during consumption of the container. As can be seen from FIGS. 1 and 4, the annular channel 36 is significant in size to accommodate more than just a few droplets of fluid. It is the formation of the annular channel, which is achieved in accordance with the present method and apparatus discussed hereinbelow.

Further, while not critical to the present invention, an upper portion of the annular wall 24 at the periphery of the annular ridge 26 is provided with a plurality of denesting lugs 42 which prevent lids which are stacked one on top of the other from nesting with one another thus making it difficult to separate the lids. In a conventional manner, the spacing the denesting lugs 42 is random such that no two adjacent lids will have identical spacings therebetween, thus preventing the denesting lugs themselves from nesting with one another.

Figure 1:
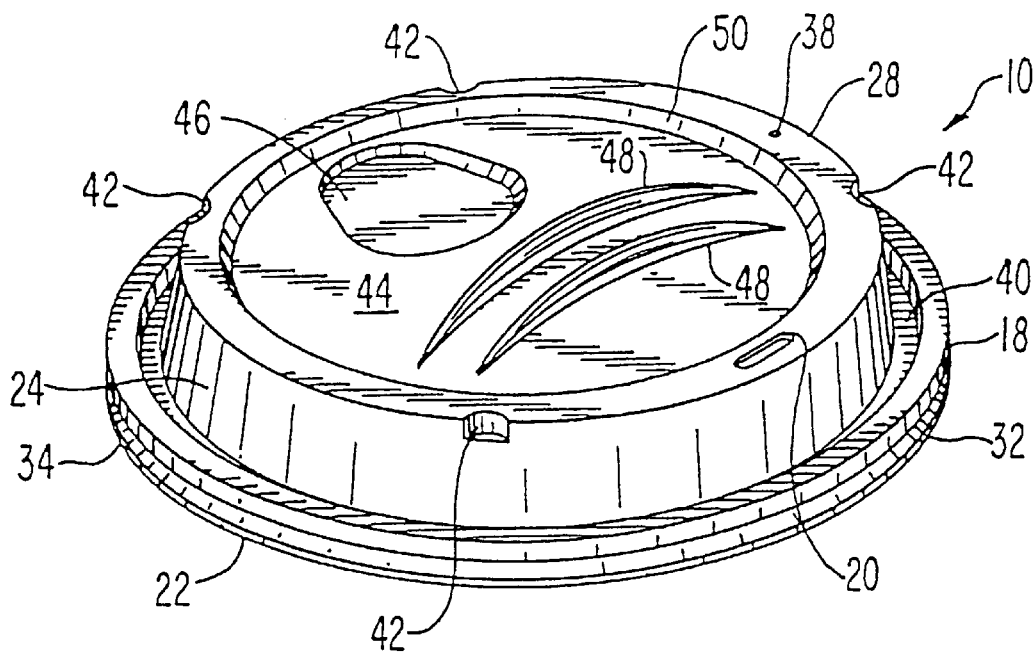
FIG. 1 is a perspective view of a lid formed in accordance with the method and apparatus of the present invention.
Figure 3:
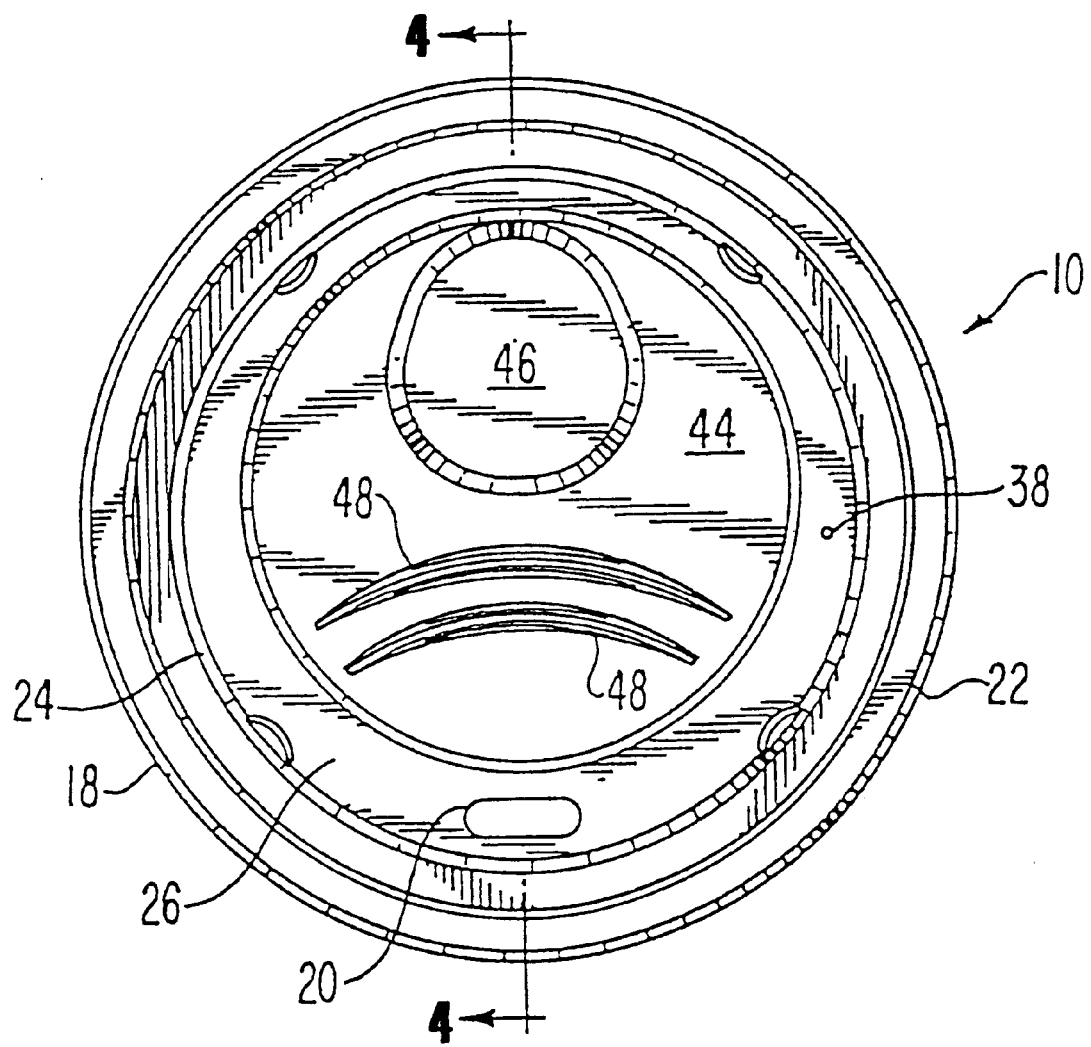
FIG. 3 is a top plan view of the lid illustrated in FIG. 1.
Figure 4:
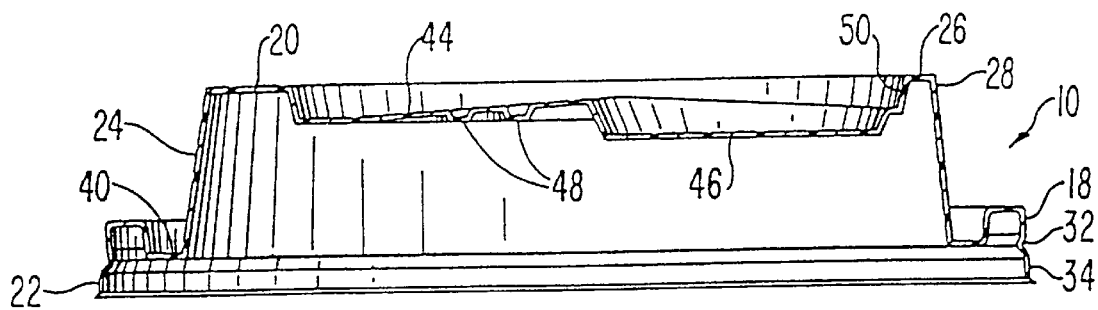
FIG. 4 is a cross-sectional elevational view of the lid of FIG. 1 taken along line 4—4 of FIG. 3.

Additionally, while not critical to the present invention, positioned in a plane lower than that of the annular ridge 26 is a periphery of the top surface 44 of the disposable lid which as can be seen from FIGS. 4 and 5 is of a conical configuration having a peak position substantially in the center of the conical surface. Further, the surface 44 is provided with a nose receiving detent 46 which accommodates the user's nose when consuming the contents of a container having the lid positioned thereon. That is, when in the drinking position, in order to lessen the degree of tilt required in the user's neck when consuming the contents of the container, the consumer's nose will extend into the detent 46 formed in the top surface 44. Also formed on the top surface is ridge 48 as illustrated in FIGS. 1, 3 and 5.

Referring now to FIGS. 6–9, the method and apparatus for forming the lid configuration set forth hereinabove will now be described in detail.

Figure 6:
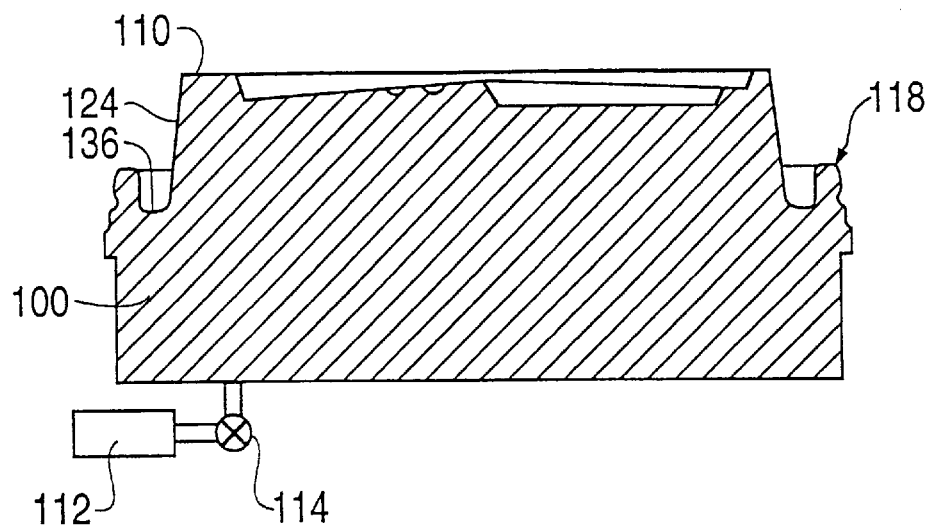
FIG. 6 is a cross-sectional view of a male die for forming the lid illustrated in FIGS. 1–5.

FIG. 6 illustrates a male die which is used in forming the lid 10 illustrated in FIGS. 1–5. The male die 100 includes an upper forming surface 110 which is formed to create the configuration of the surface of the lid 10. The male die 100 may be formed of a plurality of parts as is well known in the art, however, for simplification, this die is shown as a single structure. Further, the die may include a plurality of vent passages as is known in the art with these vent passages (not shown) communicating with a source of reduced pressure 112 by way of valve 114 in order to aid in the conforming of the thermoformable sheet material to the configuration of the male die 100. The male die 100 includes a structure which forms the various critical parts of the lid 10 illustrated in FIGS. 1–5. That is, the male die 100 includes an annular bead 118 which forms the annular mounting portion 18 as well as a side wall structure 124 for forming the annular side wall 24 of the lid 10.

Formed between the annular bead 118 and the side wall portion 124 is an annular channel forming region 136 which forms the annular channel 36 as noted hereinabove with respect to the lid 10. It is the formation of this channel which embodies the primary focus of the present invention.

In an effort to clarify the features of the present invention, the method and apparatus will be discussed in conjunction with the formation of a single lid, however, it will be well appreciated by any of those skilled in the art that a plurality of lids may be simultaneously formed from a single sheet of thermoplastic material utilizing known manufacturing methods.

Referring now to FIGS. 7, 8 and 9, and particularly FIG. 8, the male die 100 is illustrated in its preferred position below a sheet of thermoformable material 140 which forms the lid 10 in accordance with the present invention. Also illustrated in FIG. 8 is a plug assist forming device or ring 142 which is used to aid in the formation of the annular channel 36 of the lid 10. As discussed hereinabove, when forming lids of the type set forth herein, often times the sheet material forming the annular channel region 36 is thinned and consequently when a force is exerted on the upper surface of the lid when placing the lid on the container, the lid collapses and is thus destroyed. In previous efforts to overcome this shortcoming, a thicker sheet material was used, thereby providing a sufficient thickness in the annular channel region 36 such that the lid would not collapse. However, as discussed hereinabove, this adds significantly to the overall cost of the lid. Another alternative would be to utilize female tooling in order to ensure that the material thickness is maintained in the annular channel region. However, with the plug fit form by the annular channel region, it is significantly difficult to remove the formed lid from the female tool thereby slowing down the manufacturing process and again adding to the overall costs of the lid.

Accordingly, the plug assist device 142 has been developed which achieves the advantage of female tooling, while at the same time, allows the manufacturing process to be carried out using the male tool 100.

The plug assist device 142 is preferably formed of nylon, however, any suitable material which does not readily adhere to the thermoformable sheet material may be used. In this case, the nylon plug assist device 142 carries the sheet thickness down to the bottom of the plug fit area, thus maintaining the thickness of the sheet material in this area such that the lid can withstand the force required to apply it to a cup without utilizing a thicker sheet material. Consequently the thickness of the sheet material forming the annular through region is substantially the same as the thickness of a remaining portion of the lid. In this regard, the thermoformable sheet material 140 is held in position above the male die 100 by way of clamps or any suitable positioning mechanism 144. With respect to the further discussion of the manipulative steps hereinbelow, the movements described are relative movements with respect the various elements and consequently one of ordinary skill in the art would appreciate that any one or more of the components may be moved with respect to the other while maintaining one or more of such elements stationary.

Referring now to FIG. 9, the plug assist device 142 and positioning mechanism 144 are moved into the position illustrated therein. The upper portion of the male die 100 contacts a central surface of the thermoformable sheet material 140 while the outer periphery 146 of the plug assist device 142 contacts a parameter of the thermoformable sheet material 140 and carries the thermoformable sheet material down along the side wall 124 and into the annular channel region 136 as illustrated in greater detail in FIG. 7. As can be noted from FIG. 7, the inner cavity of the plug assist device 142 is of a dimension so as to not interfere with the formation of the top surface of the lid. Once in the position illustrated in FIG. 7, the plug assist device 142 may be readily retracted from the male die 100 in that the material from which the plug assist device 142 is formed will not adhere to the thermoformable sheet material 140. At this point, or shortly there before, a vacuum may be drawn by way of the low pressure source 112 by way of valve 114 in order to conform the thermoformable sheet material to the male die 100. Accordingly, by utilizing the plug assist device 142, a lid configuration having a raised dome as well as a deep annular channel for forming a plug fit with a cup on which the lid is to be placed can be achieved without resorting to a thicker thermoformable sheet material or a female die configuration.

Accordingly, the advantages of the present invention are achieved providing the apparatus and carrying out the method described hereinabove for forming a lid having an annular mounting portion, an annular trough region positioned radially inward of the annular mounting portion, an annular side wall extending upwardly from an inner periphery of the annular trough region to an annular ridge adjacent said annular side wall, and a crown region. As noted hereinabove, the apparatus includes a forming die having an upper surface of a configuration conforming to the configuration of the lid, a forming ring for aiding in the forming of the lid, a positioning device for positioning the thermoformable sheet material adjacent the upper surface of the forming die between the forming die and the forming ring and a drive mechanism for lowering the forming ring into contact with the sheet material. The method includes contacting that portion of the sheet material which forms a lowermost region of the lid with the forming ring so as to carry the material down into the lowermost region of the forming die.

While the present invention has been described with reference to a preferred embodiment, it should be appreciated by those skilled in the art that the invention may be practiced otherwise than as specifically described herein without departing from the spirit and scope of the invention. It is, therefore, to be understood that the spirit and scope of the invention be limited only by the appended claims.

We claim:

1. A lid having a substantially uniform thickness formed of a thermoformable sheet material comprising:

an annular mounting portion for sealingly engaging the drinking cup;

an annular trough region positioned radially inwardly of the annular mounting portion, said annular trough region having a thickness;

an annular side wall extending upwardly from an inner periphery of said annular trough region to an annular ridge adjacent said annular side wall, said annular side wall having a thickness substantially equal to said thickness of said annular trough region;

a drinking opening formed in said annular ridge; and a crown region having a periphery adjacent said annular ridge.

2. The lid as defined in claim 1, wherein said annular trough region forms a plug fit with an inner side wall of a cup when the lid is positioned on the cup.

3. The lid as defined in claim 2, wherein said trough region is of a radial dimension substantially equal to a radial dimension of said annular mounting portion.

4. The lid as defined in claim, 3, wherein a lowermost portion of said annular trough region lies in a first substantially horizontal plane and an uppermost portion of said annular mounting portion lies in a second substantially horizontal plane above said first horizontal plane.

5. The lid as defined in claim 4, wherein said annular ridge includes a substantially planar surface and said surface lies in a substantially horizontal plane above said first and second planes.

* * * * *